(12) United States Patent
Wang et al.

(10) Patent No.: US 12,483,301 B2
(45) Date of Patent: Nov. 25, 2025

(54) DYNAMIC CODEBOOKS FOR ACTIVE COORDINATION SETS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 308 days.

(21) Appl. No.: 18/264,203

(22) PCT Filed: Feb. 24, 2021

(86) PCT No.: PCT/US2021/019387
§ 371 (c)(1),
(2) Date: Aug. 3, 2023

(87) PCT Pub. No.: WO2022/182339
PCT Pub. Date: Sep. 1, 2022

(65) Prior Publication Data
US 2024/0097752 A1 Mar. 21, 2024

(51) Int. Cl.
*H04B 7/0456* (2017.01)
*H04B 7/06* (2006.01)
*H04L 25/03* (2006.01)

(52) U.S. Cl.
CPC ......... *H04B 7/0456* (2013.01); *H04B 7/0626* (2013.01); *H04B 7/0639* (2013.01); *H04L 25/03904* (2013.01)

(58) Field of Classification Search
CPC .... H04B 7/024; H04B 7/0456; H04B 7/0626; H04B 7/0639; H04L 25/03904
See application file for complete search history.

(56) References Cited

U.S. PATENT DOCUMENTS

| 8,760,994 B2 | 6/2014 | Wang et al. |
| 9,374,716 B2 * | 6/2016 | Enescu ................. H04W 24/02 |

(Continued)

FOREIGN PATENT DOCUMENTS

| EP | 3186898 B1 * | 4/2019 | ....... H04L 25/03987 |
| WO | WO-2010075640 A1 * | 7/2010 | ........... H04B 7/0639 |

(Continued)

OTHER PUBLICATIONS

"5G; Study on New Radio (NR) Access Technology", 3GPP TR 38.912 version 15.0.0 Release 15), Sep. 2018, 76 pages.

(Continued)

*Primary Examiner* — Mehmood B. Khan
(74) *Attorney, Agent, or Firm* — Colby Nipper PLLC (57) ABSTRACT

This document describes methods, devices, systems, and means for determining a joint-codebook for wireless communication with a user equipment, UE, by a base station in an active coordination set, ACS, in which a base station receives capability information from one or more other base stations in the ACS. The base station generates a joint-codebook for the ACS based on the received capability information and sends the joint-codebook to the one or more other base stations in the ACS. The base station and the other base stations in the ACS jointly-transmit the joint-codebook to the UE and receive Precoding Matrix Indicator, PMI, feedback from the UE. The base station and the other base stations in the ACS jointly-process downlink data for the UE using the PMI feedback and the joint-codebook and jointly-transmit the downlink data to the UE.

20 Claims, 7 Drawing Sheets

(56) References Cited

U.S. PATENT DOCUMENTS

| | | | |
|---|---|---|---|
| 2011/0103503 A1* | 5/2011 | Shin | H04B 7/0634 |
| | | | 375/267 |
| 2012/0014272 A1 | 1/2012 | Zhou et al. | |
| 2012/0021738 A1* | 1/2012 | Koo | H04L 5/0035 |
| | | | 455/422.1 |
| 2012/0044978 A1* | 2/2012 | Wang | H04J 11/0053 |
| | | | 375/219 |
| 2013/0114656 A1 | 5/2013 | Sayana et al. | |
| 2020/0178131 A1 | 6/2020 | Wang et al. | |
| 2020/0187281 A1 | 6/2020 | Wang et al. | |
| 2020/0204231 A1 | 6/2020 | Tong et al. | |
| 2022/0014250 A1* | 1/2022 | Sun | H04B 7/0478 |
| 2022/0052824 A1* | 2/2022 | Kim | H04L 1/1664 |
| 2023/0058460 A1* | 2/2023 | Huang | H04B 7/0639 |
| 2024/0422608 A1* | 12/2024 | Li | H04W 24/02 |

FOREIGN PATENT DOCUMENTS

| | | | | |
|---|---|---|---|---|
| WO | WO-2012152037 A1 * | 11/2012 | | H04L 5/0035 |
| WO | WO-2015014321 A1 * | 2/2015 | | H04B 7/0469 |
| WO | 2015060880 | 4/2015 | | |
| WO | WO-2020063301 A1 * | 4/2020 | | H04W 72/04 |
| WO | 2020112680 | 6/2020 | | |
| WO | 2020180816 | 9/2020 | | |
| WO | 2022182339 | 9/2022 | | |

OTHER PUBLICATIONS

"Closed-Loop Coordinated Transmission Scheme", 3GPP TSG RAN WG1 Meeting #87, Reno, USA, Nov. 2016, 6 pages.

"International Search Report and Written Opinion", Application No. PCT/US2021/019387, Dec. 6, 2021, 11 pages.

Zhang, et al., "A Dynamically-Updating Adaptive Codebook Design for COMP Joint Transmission", 2012 International Conference on Systems and Informatics (ICSAI 2012), Jun. 25, 2012, 5 pages.

"Foreign Office Action", EP Application No. 21710380.3, Aug. 27, 2024, 5 pages.

"International Preliminary Report on Patentability", Application No. PCT/US2021/019387, Aug. 29, 2023, 8 pages.

* cited by examiner

DYNAMIC CODEBOOKS FOR ACTIVE COORDINATION SETS

RELATED APPLICATION(S)

This application is a national stage entry of International Application No. PCT/US2021/019387, filed Feb. 24, 2021, the disclosure of which is incorporated herein by reference in its entirety.

BACKGROUND

An Active Coordination Set (ACS) of base stations provides and optimizes mobility management and other services to a user equipment (UE) in a radio access network (RAN). The ACS may be a component of, or used to implement, a user-centric no-cell (UCNC) network architecture. As a UE moves throughout the coverage provided by the RAN, the UE continually determines and updates, from its perspective, which base stations are usable for wireless communication.

The evolution of wireless communication systems to fifth generation (5G) New Radio (NR) and Sixth Generation (6G) technologies provides higher data rates to users. By employing techniques, such as Coordinated MultiPoint (CoMP) over beamformed wireless connections within an ACS, still higher data rates can be provided at the edges of 5G and 6G cells. UE mobility, however, can cause changes in the base stations included in an ACS.

SUMMARY

This summary is provided to introduce simplified concepts of dynamic codebooks for active coordination sets. The simplified concepts are further described below in the Detailed Description. This summary is not intended to identify essential features of the claimed subject matter, nor is it intended for use in determining the scope of the claimed subject matter. Based on the configurations of base stations in the ACS and changes in the set of base stations participating in the ACS, codebooks for a specific ACS need to be sent to the UE to enable the UE to perform precoding feedback.

In aspects, methods, devices, systems, and means for determining a joint-codebook for wireless communication with a user equipment (UE) by a base station in an active coordination set (ACS) describe a base station receiving capability information from one or more other base stations in the ACS. The base station generates a joint-codebook for the ACS based on the received capability information and sends the joint-codebook to the one or more other base stations in the ACS. The base station and the other base stations in the ACS jointly-transmit the joint-codebook to the UE and receive Precoding Matrix Indicator (PMI) feedback from the UE. The base station and the other base stations in the ACS jointly-process downlink data for the UE using the PMI feedback and the joint-codebook and jointly-transmit the downlink data to the UE.

BRIEF DESCRIPTION OF THE DRAWINGS

Aspects of dynamic codebooks for active coordination sets are described with reference to the following drawings. The same numbers are used throughout the drawings to reference like features and components.

DETAILED DESCRIPTION

This document describes methods, devices, systems, and means for determining a joint-codebook for wireless communication with a user equipment (UE) by a base station in an active coordination set (ACS) in which a base station receives capability information from one or more other base stations in the ACS. The base station generates a joint-codebook for the ACS based on the received capability information and sends the joint-codebook to the one or more other base stations in the ACS. The base station and the other base stations in the ACS jointly-transmit the joint-codebook to the UE and receive Precoding Matrix Indicator (PMI) feedback from the UE. The base station and the other base stations in the ACS jointly-process downlink data for the UE using the PMI feedback and the joint-codebook and jointly-transmit the downlink data to the UE.

UE mobility (changes in UE location) can dynamically change the set of base stations included in an ACS. As the composition of the ACS changes, the phase coherence capabilities and the antenna configuration (e.g., a number of antenna ports, a number of antenna panels, a number of beams available for azimuth and/or elevation, etc.) for base stations in the ACS can change as well. For a UE to be able to perform precoding feedback, a coordinating base station sends a joint-codebook that includes UE-specific precoding matrices for the ACS to the UE.

The joint-codebook for an ACS with a set of base stations may not have any particular relationship with individual codebooks for each base station. For example, for phase coherence, the joint-codebook can require each base station to apply a different phase shift and the amount of phase shift can depend on the number of base stations in the ACS. A joint-codebook includes a respective set of precoding matrices for each base station in the ACS. The precoding matrices of the joint-codebook are such that, when each base station in the ACS processes downlink data in accordance with a precoding matrix selected from its respective set of precoding matrices, joint transmission of downlink data to the UE is improved (as compared to a scenario in which each base station processes downlink data in accordance with an individual codebook whose precoding matrices are independent of those of other base stations in the ACS).

While features and concepts of the described devices, systems, and methods for dynamic codebooks for active coordination sets can be implemented in any number of different environments, systems, devices, and/or various configurations, aspects of dynamic codebooks for active coordination sets are described in the context of the following example devices, systems, and configurations.

Example Environment

Figure 1:
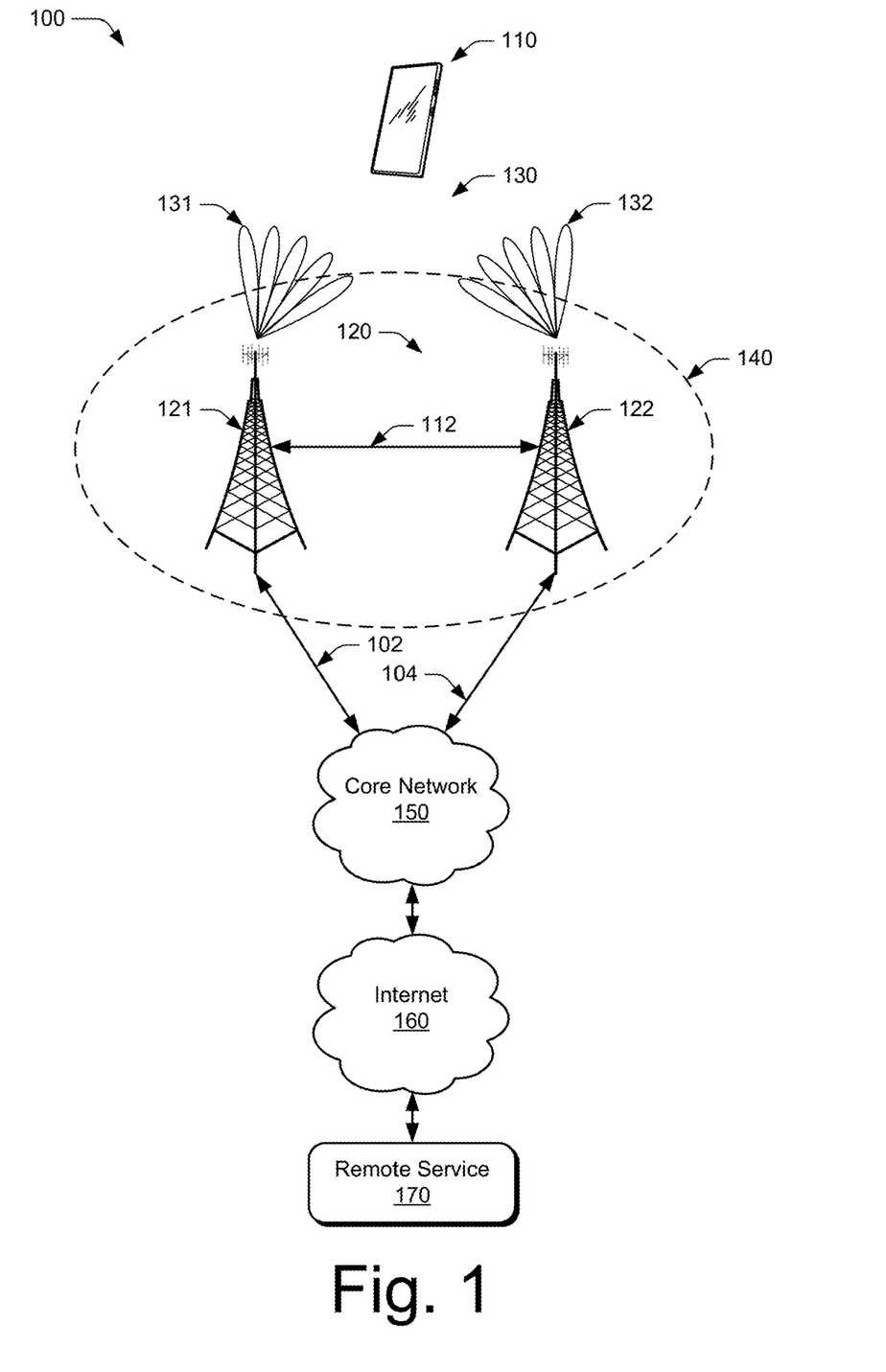
FIG. 1 illustrates an example wireless network system in which various aspects of dynamic codebooks for active coordination sets can be implemented.

FIG. 1 illustrates an example environment 100 in which various aspects of dynamic codebooks for active coordination sets can be implemented. The example environment 100 includes a user equipment 110 (UE 110) that communicates with one or more base stations 120 (illustrated as base stations 121 and 122), through one or more wireless communication links 130 (wireless link 130), illustrated as wireless links 131 and 132. In this example, the user equipment 110 is implemented as a smartphone. Although illustrated as a smartphone, the user equipment 110 may be implemented as any suitable computing or electronic device, such as a mobile communication device, a modem, cellular phone, gaming device, navigation device, media device, laptop computer, desktop computer, tablet computer, smart appliance, or vehicle-based communication system. The base stations 120 (e.g., an Evolved Universal Terrestrial Radio Access Network Node B, E-UTRAN Node B, evolved Node B, eNodeB, eNB, Next Generation Node B, gNode B, gNB, a 6G node B, or the like) may be implemented in a macrocell, microcell, small cell, picocell, and the like, or any combination thereof.

The base stations 120 communicate with the user equipment 110 via the wireless links 131 and 132, which may be implemented as any suitable type of wireless link. The wireless links 131 and 132 can include a downlink of data and control information communicated from the base stations 120 to the user equipment 110, an uplink of other data and control information communicated from the user equipment 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), 6G, and future evolutions. Multiple wireless links 130 may be aggregated in a carrier aggregation to provide a higher data rate for the user equipment 110. Multiple wireless links 130 from multiple base stations 120 may be configured for Coordinated Multipoint (CoMP) communication with the user equipment 110. Additionally, multiple wireless links 130 may be configured for single-radio access technology (RAT) (single-RAT) dual connectivity (single-RAT-DC) or multi-RAT dual connectivity (MR-DC).

The base stations 120 are collectively a Radio Access Network 140 (RAN, Evolved Universal Terrestrial Radio Access Network, E-UTRAN, 5G NR RAN or NR RAN). The base stations 121 and 122 in the RAN 140 are connected to a core network 150, such as a Fifth Generation Core (5GC) or 6G core network. The base stations 121 and 122 connect, at 102 and 104 respectively, to the core network 150 via an NG2 interface (or a similar 6G interface) for control-plane signaling and via an NG3 interface (or a similar 6G interface) for user-plane data communications. In addition to connections to core networks, base stations 120 may communicate with each other via an Xn Application Protocol (XnAP), at 112, to exchange user-plane and control-plane data. The user equipment 110 may also connect, via the core network 150, to public networks, such as the Internet 160 to interact with a remote service 170.

Example Devices

Figure 2:
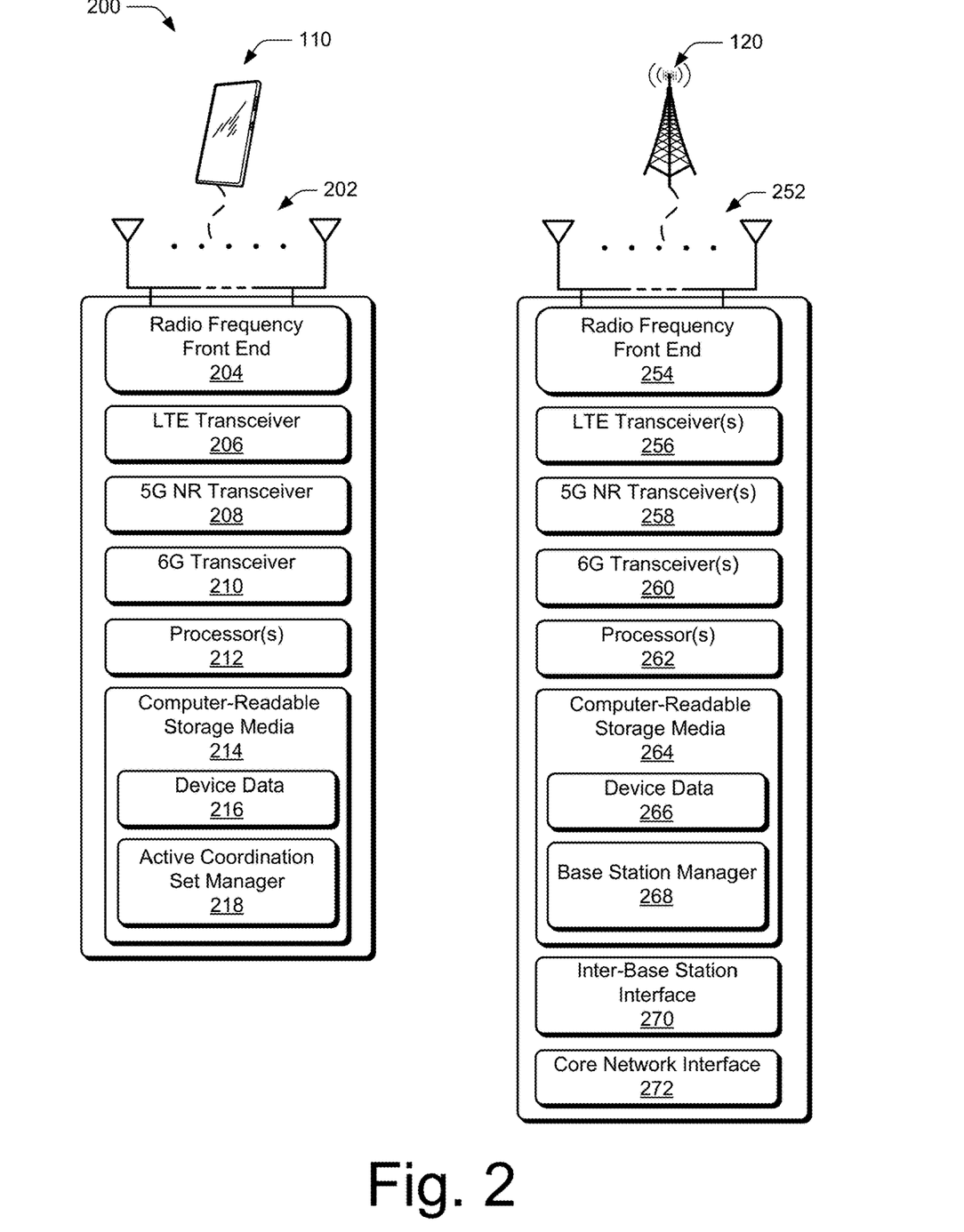
FIG. 2 illustrates an example device diagram that can implement various aspects of dynamic codebooks for active coordination sets.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, a 5G NR transceiver 208, and a 6G transceiver 210 for communicating with base stations 120 in the RAN 140. The RF front end 204 of the user equipment 110 can couple or connect the LTE transceiver 206, the 5G NR transceiver 208, and the 6G transceiver 210 to the antennas 202 to facilitate various types of wireless communication. The antennas 202 of the user equipment 110 may include an array of multiple antennas that are configured similarly to or differently from each other. The antennas 202 and the RF front end 204 can be tuned to, and/or be tunable to, one or more frequency bands defined by the 3GPP LTE, 5G NR, and 6G communication standards and implemented by the LTE transceiver 206, the 5G NR transceiver 208, and/or the 6G transceiver 210. Additionally, the antennas 202, the RF front end 204, the LTE transceiver 206, the 5G NR transceiver 208, and/or the 6G transceiver 210 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE, 5G NR, and 6G communication standards.

The user equipment 110 also includes processor(s) 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the user equipment 110. The device data 216 includes user data, multimedia data, beamforming codebooks, applications, and/or an operating system of the user equipment 110, which are executable by processor(s) 212 to enable user-plane communication, control-plane signaling, and user interaction with the user equipment 110.

In some implementations, the CRM 214 may also include an active coordination set (ACS) manager 218. The ACS manager 218 can communicate with the antennas 202, the RF front end 204, the LTE transceiver 206, the 5G NR transceiver 208, and/or the 6G transceiver 210 to monitor the quality of the wireless communication links 130. Based on this monitoring, the ACS manager 218 can determine to add or remove base stations 120 from the ACS, determine PMI feedback, and/or determine beams to use for communication with base stations.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Remote Radio Head (RRH), Radio Unit (RU), and/or Remote Radio Unit (RRU). The base stations 120 include antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and/or the 6G transceivers 260 to the antennas 252 to facilitate various types of wireless communication. The antennas 252 of the base stations 120 may include an array of multiple antennas that are configured similarly to or differently from each other. The antennas 252 and the RF front end 254 can be tuned to, and/or be tunable to, one or more frequency band defined by the 3GPP LTE, 5G NR, and 6G communication standards, and implemented by the LTE transceivers 256, one or more 5G NR transceivers 258, and/or one or more 6G transceivers 260. Additionally, the antennas 252, the RF front end 254, the LTE transceivers 256, one or more 5G NR transceivers 258, and/or one or more 6G transceivers 260 may be configured to support beamforming, such as Massive-MIMO, for the transmission and reception of communications with the UE 110.

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, beamforming codebooks, applications, and/or an operating system of the base stations 120, which are executable by processor(s) 262 to enable communication with the user equipment 110.

CRM 264 also includes a base station manager 268. Alternately or additionally, the base station manager 268 may be implemented in whole or part as hardware logic or circuitry integrated with or separate from other components of the base stations 120. In at least some aspects, the base station manager 268 configures the LTE transceivers 256, the 5G NR transceivers 258, and the 6G transceiver(s) 260 for communication with the user equipment 110, as well as communication with a core network, such as the core network 150, and routing user-plane and control-plane data for joint communication. Additionally, the base station manager 268 may allocate air interface resources, schedule communications, and generate joint-precoding-matrix codebooks for the UE 110 and base stations 120 in the ACS when the base station 120 is acting as a coordinating base station for the base stations 120 in the ACS.

The base stations 120 include an inter-base station interface 270, such as an Xn and/or X2 interface, which the base station manager 268 configures to exchange user-plane and control-plane data between other base stations 120, to manage the communication of the base stations 120 with the user equipment 110. The base stations 120 include a core network interface 272 that the base station manager 268 configures to exchange user-plane and control-plane data with core network functions and/or entities.

Figure 3:
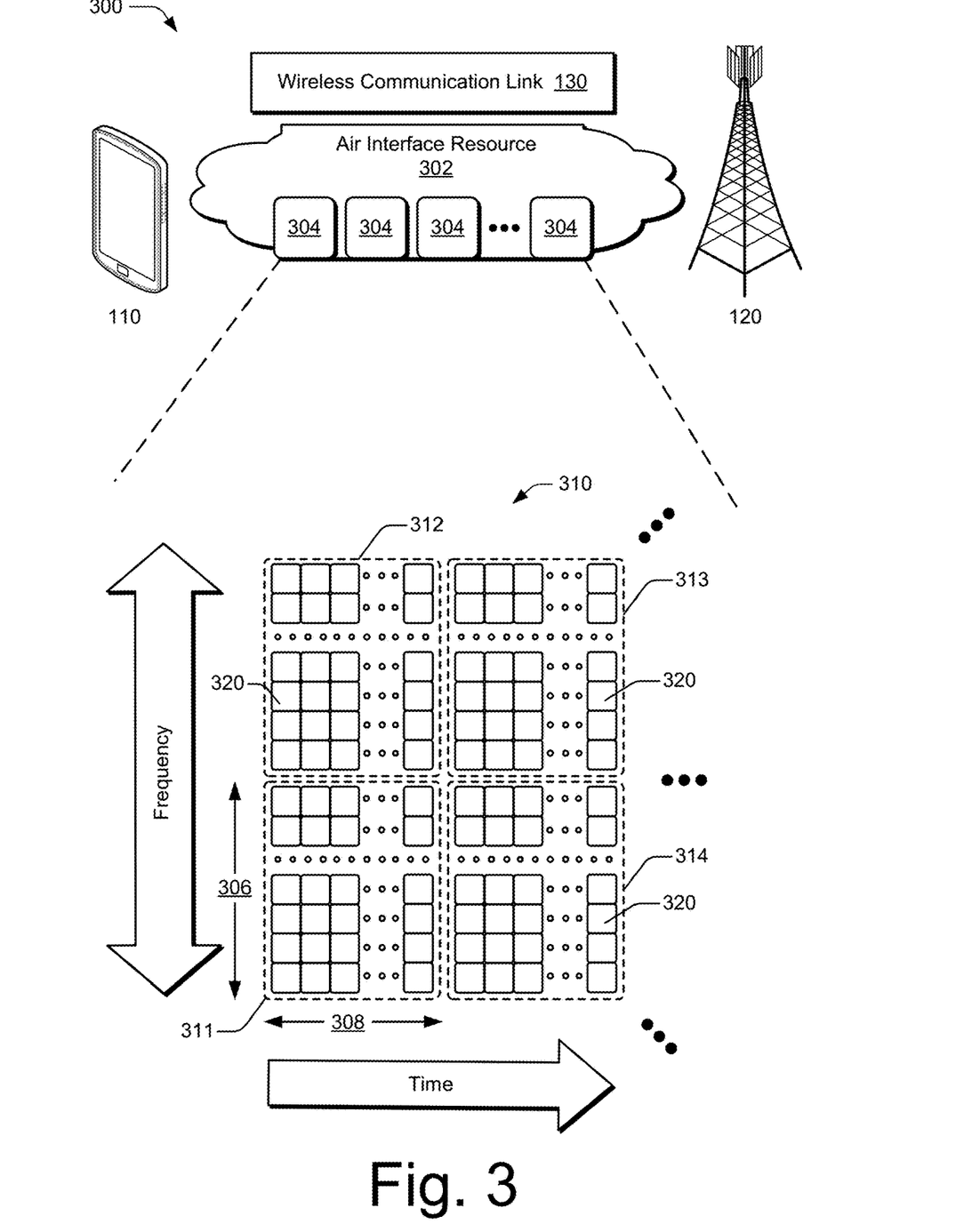
FIG. 3 illustrates an air interface resource that extends between a user equipment and a base station and with which various aspects of dynamic codebooks for active coordination sets techniques can be implemented.

FIG. 3 illustrates an air interface resource that extends between a user equipment and a base station and with which various aspects of dynamic codebooks for active coordination sets can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or seven orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The base station manager 268 (shown in FIG. 2) may determine a respective data-rate, type of information, or amount of information (e.g., data or control information) to be communicated (e.g., transmitted) by the user equipment 110. For example, the base station manager 268 can determine that each user equipment 110 is to transmit at a different respective data rate or transmit a different respective amount of information. The base station manager 268 then allocates one or more resource blocks 310 to each user equipment 110 based on the determined data rate or amount of information.

Additionally, or in the alternative to block-level resource grants, the base station manager 268 may allocate resource units at an element-level. Thus, the base station manager 268 may allocate one or more resource elements 320 or individual subcarriers to different user equipment 110. By so doing, one resource block 310 can be allocated to facilitate network access for multiple user equipment 110. Accordingly, the base station manager 268 may allocate, at various granularities, one or up to all subcarriers or resource elements 320 of a resource block 310 to one user equipment

110 or divided across multiple user equipment 110, thereby enabling higher network utilization or increased spectrum efficiency.

The base station manager 268 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the base station manager 268 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, and/or the 6G transceiver 210 to communicate via the allocated resource units 304 of the air interface resource 302.

Active Coordination Set

Figure 4:
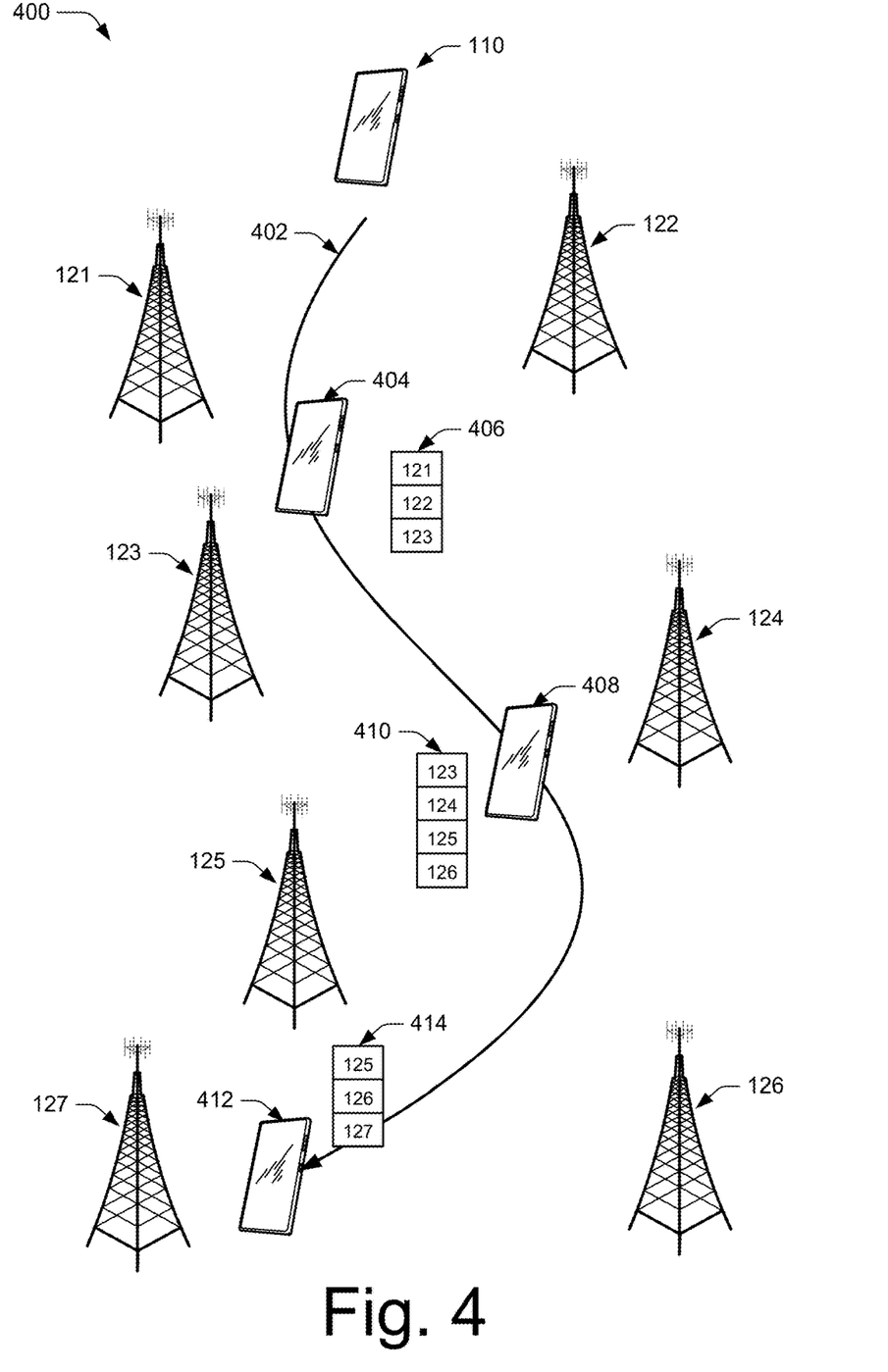
FIG. 4 illustrates an example of a user equipment moving through a radio access network that includes multiple base stations in accordance with aspects of dynamic codebooks for active coordination sets techniques.

FIG. 4 illustrates an example environment 400 in which a user equipment 110 is moving through a radio access network (RAN) that includes multiple base stations 120, illustrated as base stations 121-127. These base stations may utilize different technologies (e.g., LTE, 5G NR, 6G) at a variety of frequencies (e.g., sub-gigahertz, sub-6 GHz, and above 6 GHz bands and sub-bands). An ACS is a set of base stations, determined by a UE, that perform coordinated communication with the UE, such as by using joint-transmission and/or joint-reception by the base stations in the ACS to communicate with the UE.

For example, the user equipment 110 follows a path 402 through the RAN 140. The user equipment 110 periodically measures the link quality (e.g., of base stations that are currently in the ACS and candidate base stations that the UE 110 may add to the ACS. For example, at position 404, the ACS at 406 includes the base stations 121, 122, and 123. As the UE 110 continues to move, at position 408, the UE 110 has deleted base station 121 and base station 122 from the ACS and added base stations 124, 125, and 126, as shown at 410. Continuing along the path 402, the UE 110, at position 412, has deleted the base stations 123 and 124 and added the base station 127, as shown in the ACS at 414.

Figure 5:
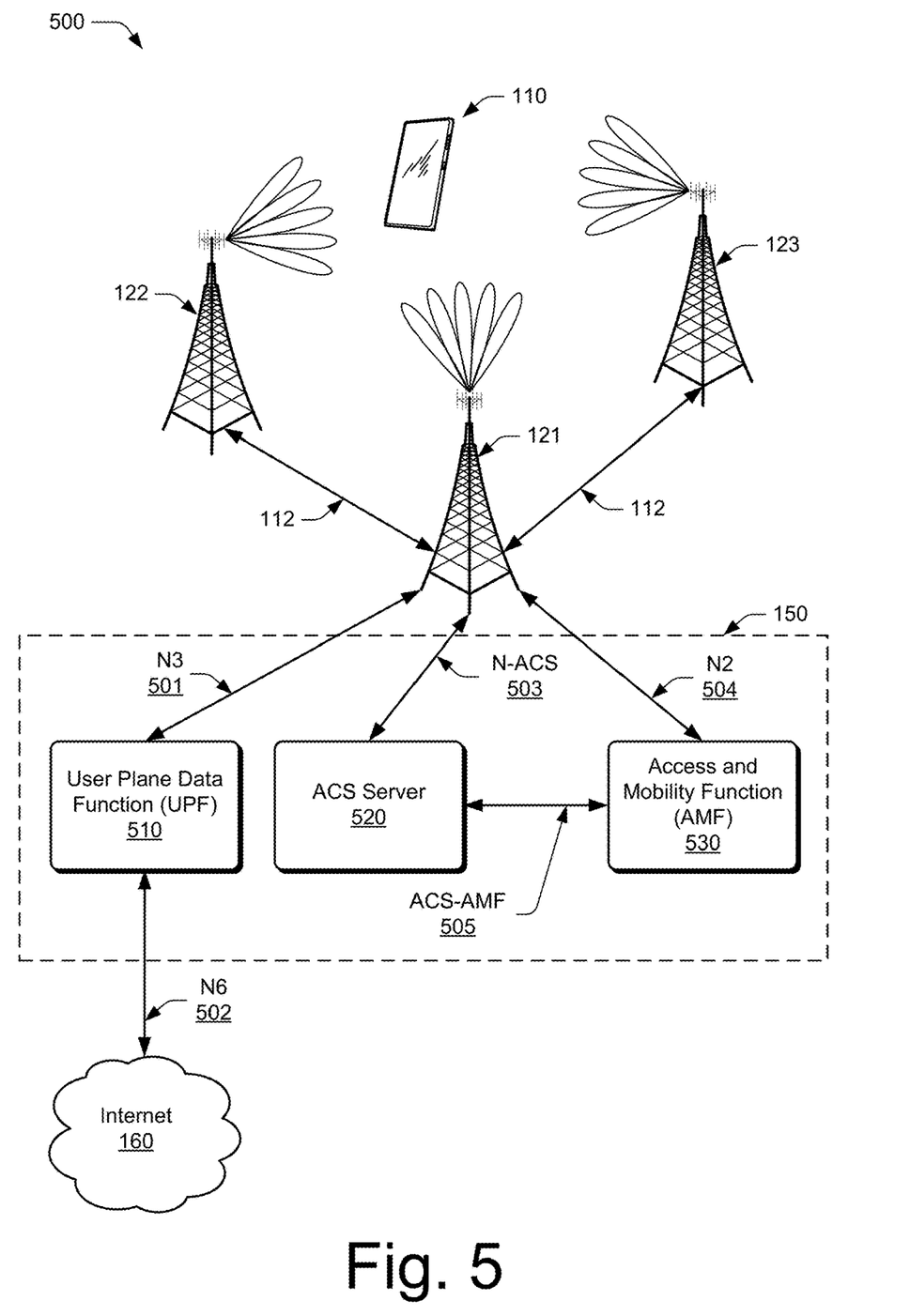
FIG. 5 illustrates an example environment in which various aspects of dynamic codebooks for active coordination sets can be implemented.

FIG. 5 illustrates an example environment 500 in which various aspects of dynamic codebooks for active coordination sets can be implemented. The user equipment 110 is engaged in joint transmission and/or reception (joint communication) with the three base stations 121, 122, and 123. The base station 121 is acting as a coordinating base station for the joint transmission and/or reception. Which base station is the coordinating base station is transparent to the UE 110, and the coordinating base station can change as base stations are added and/or removed from the ACS. The coordinating base station coordinates control-plane and user-plane communications for the joint communication with the UE 110 via the Xn interfaces 112 (or a similar 6G interface) to the base stations 122 and 123 and maintains the user-plane context between the UE 110 and the core network 150. The coordination may be performed using proprietary or standards-based messaging, procedures, and/or protocols.

In joint-transmission, multiple transmitters (of the base stations 120) coordinate transmission of signals for the same set of data to increase transmit power, as compared to a single transmitter, and improve the link budget to a receiver. In joint-reception, multiple-receivers (of the base stations 120) each receive transmitted signals for the same set of data and accumulate the UQ samples from each of the receivers to decode the combined UQ samples into the set of data. By using joint-reception, the receivers provide increased receiver sensitivity, as compared to a single receiver, and improve the link budget for receiving the data from a transmitter.

The coordinating base station schedules air interface resources for the joint communication for the UE 110 and the base stations 121, 122, and 123, based on the ACS associated with the UE 110. The coordinating base station (base station 121) connects, via an N3 interface 501 (or a 6G equivalent interface), to the User Plane Function 510 (UPF 510) in the core network 150 for the communication of user plane data to and from the user equipment 110. The coordinating base station distributes the user-plane data to all the base stations in the joint communication via the Xn interfaces 112. The UPF 510 is further connected to a data network, such as the Internet 160 via the N6 interface 502.

UE 110 downlink data can be sent from all of the base stations 120 in the ACS or any subset of the base stations 120 in the ACS. The coordinating base station 121 determines which combination of base stations 120 in the ACS to use to transmit downlink data to the UE 110. The selection of base stations 120 to use to transmit downlink data can be based on one or more factors, such as application quality of service (QoS) requirements, location of the UE 110, velocity of the UE 110, a Reference Signal Received Power (RSRP), a Received Signal Strength Indicator (RSSI), interference, or the like. UE 110 uplink data can be received by all of the base stations 120 in the ACS or any subset of the base stations 120 in the ACS.

Similarly to downlink data, the coordinating base station 121 determines which combination of base stations 120 in the ACS to use to receive uplink data from the UE 110. The selection of base stations 120 to use to receive uplink data can be based on one or more factors, such as application QoS requirements, location of the UE 110, velocity of the UE 110, RSRP, RSSI, interference, or the like. Typically, the combination of base stations 120 for downlink transmission and uplink reception will be identical, although different combinations of base stations 120 may be used for downlink transmission and uplink reception.

When the user equipment 110 creates or modifies an ACS, the user equipment 110 communicates the ACS or the ACS modification to an ACS Server 520 that stores the ACS for each user equipment 110 operating in the RAN 140. Although shown in the core network 150, alternatively the ACS Server 520 may be an application server located outside the core network 150. The user equipment 110 communicates the ACS or ACS modification via the coordinating base station (base station 121) which is connected to the ACS Server 520 via an N-ACS interface 503. Optionally or alternatively, the user equipment 110 communicates the ACS or ACS modification to the ACS Server 520 via the Access and Mobility Function 530 (AMF 530) which is connected to the coordinating base station (base station 121) via an N2 interface 504. The AMF 530 relays ACS-related communications to and from the ACS Server 520 via an ACS-AMF interface 505. ACS data between the user equipment 110 and the ACS Server 520 can be communicated via Radio Resource Control (RRC) communications, Non-Access Stratum (NAS) communications, or application-layer communications.

Whenever there is a change to the constituent base stations in the ACS for any particular user equipment 110, the ACS Server 520 sends a copy of the modified ACS configuration to the coordinating base station (base station 121) for that UE. The copy of the ACS configuration stored in the ACS Server 520, can be considered to be the master copy of the ACS configuration for the UE 110. Optionally, in addition to adding and removing base stations 120 and beamforming parameters from the ACS, the UE 110 can query the ACS Server 520, via one or more of the base stations 120, to retrieve a copy of the configuration of the ACS. The coordinating base station uses schedules air interface resources for joint communication between the ACS and the user equipment 110. For example, when a new base station is added to the ACS or an existing base station in the ACS is deleted, the coordinating base station allocates air interface resources for the new base station to participate in the joint communication or deallocates resources for the deleted base station. The coordinating base station relays user-plane data based on the ACS received from the ACS Server 520. Continuing with the example, the coordinating base station starts routing user-plane data to the new base station added to the ACS or terminates relaying data to the existing base station that was removed from the ACS. If the coordinating base station 121 is removed from the ACS, a different base station 120 is designated as the coordinating base station. This change of coordinating base stations is transparent to the UE 110. For example, when the ACS Server 520 determines that the current coordinating base station is to be removed from the ACS, the ACS Server 520 and/or other core network functions, such as the AMF 530, determines which base station 120 in the updated ACS will be the new coordinating base station. A message indicating the change of the coordinating base station is communicated to the current and new coordinating base stations, which is effective to move the functions of managing communication in the ACS from the current coordinating base station to the new coordinating base station.

In aspects, the initial ACS for the user equipment 110 can be established by the UE 110 during or after the UE 110 performs an attach procedure to connect to the RAN 140. For example, the UE 110 can initialize the ACS with the base stations 120 included in the neighbor relation table of the base station through which the UE 110 attaches to the RAN 140. In another example, the UE 110 considers the base stations 120 included in the neighbor relation table as candidates for the ACS and then measures the link quality of each candidate base station before adding a candidate base station to the ACS. In a further example, the user equipment 110 queries the ACS Server 520 for the last ACS used by the user equipment 110 or an ACS used by this or another UE 110 at the current location of the UE 110. The UE 110 then validates the entries in the last-used ACS to determine which, if any, entries of the last-used ACS are usable for communication and inclusion in the ACS. In another example, the UE 110, measures the link quality of any base stations 120 from the previous ACS that are within communication range and populates the ACS with one or more of the base stations 120 that exceed a threshold for inclusion (e.g., above a threshold for a Received Signal Strength Indicator (RSSI), a Reference Signal Received Power (RSRP), or a Reference Signal Received Quality (RSRQ)).

The user equipment 110 adds or deletes a base station 120 from the ACS by sending an ACS modification message to the ACS Server 520. The ACS modification message includes an identifier for a base station to add or delete from the ACS along with an indicator to either add or delete the identified base station. When adding a base station to the ACS, the ACS modification message can also include beamforming parameters for the base station being added. Optionally, or additionally, the ACS modification message may include identifiers of multiple base stations with corresponding add/delete indicators for each base station. Other information useful to the management of the ACS may be stored in or with the ACS, such as timestamps for entries in the ACS, geographic location information from the UE, an identifier for the UE 110, identification information for the current coordinating base stations, and the like.

The ACS Server 520 receives the ACS modification message from the UE 110 (via the current coordinating base station) and performs the requested modification to an ACS record for the UE 110 that is stored by the ACS server 520. After receiving the ACS modification message, the ACS Server 520 sends a modified copy of the ACS for the UE 110 to the coordinating base station (base station 121) via the N-ACS interface 503. Optionally or alternatively, the ACS Server 520 may send only the modification of the ACS to the coordinating base station which causes the coordinating base station to update its copy of the ACS. The base station manager 268 in the coordinating base station uses the updated or modified ACS to modify the scheduling of resources and joint communications for the base stations 120 in the ACS. The coordinating base station can perform real-time scheduling of resources within the ACS of the user equipment 110 to respond to changing channel conditions or communication requirements with low latency requirements.

Dynamic Codebooks for Active Coordination Sets

In aspects, base stations within an ACS communicate and coordinate with each other to provide a joint-codebook for the UE 110. For example, base stations 122 and 123 each send capability information to the coordinating base station 121. The coordinating base station 121 generates the joint-precoding-matrix codebook for the ACS that is UE-specific for communication between the ACS and the UE 110.

Phase coherence between base stations in the ACS is an important factor for joint-communication between the ACS and the UE. The base stations in the ACS send their phase coherence capability to the coordinating base station 121 to use as a factor in generating the joint-codebook. For example, the phase coherence capability indicates the source of the phase reference used by a base station, such as a Global Navigation Satellite System (GNSS), IEEE 1588 Precision Time Protocol (PTP), or Synchronous Ethernet (SyncE).

When the base stations in the ACS use a common phase reference, the base stations in the ACS can use the same air interface resources for joint transmission. In the event that different phase references are used by base stations in the ACS, the coordinating base station 121 can select a portion of the available antenna elements at the base stations in the ACS and/or schedule air interface resources for the base stations in the ACS to mitigate a scenario where non-phase-coherence leads to destructive addition or cancellation of transmitted signals. For example, the coordinating base station 121 schedules a first subset of base stations in the ACS that share a first phase reference to transmit in a first time slot and schedules a second subset of base stations in the ACS that share a second phase reference to transmit in a second time slot to maintain phase coherence in the first and second time slots, respectively.

The joint-precoding-matrix codebook for a UE 110 can be determined based on the phase coherence capabilities among base stations 120 in the ACS. For example, a subset of base stations 120 in an ACS can be phase coherent (e.g., the RF components of the base stations are disciplined to a first common timebase) while another subset of base stations 120 in the ACS may not be phase coherent (e.g., the RF components of the base stations are not disciplined to the first common timebase). For example, when there is no phase coherence between certain base stations in the ACS, then coherent beamforming may not be possible using the non-phase coherent base stations. In this case, the joint-codebook can define selective transmission among a few subsets of phase-coherent base stations. This is determined by the amount of synchronization between base stations 120 in the ACS. For example, whether the base stations can maintain frequency synchronization by being disciplined to a common clock (timebase). Each base station can be synchronized to the common clock using SyncE or PTP to discipline each base station's clock to the common clock. Alternatively, a second base station can be calibrated to a first base station based on RF transmissions of the first base station. For example, the second base station receives an RF calibration signal from the first base station, and then measures the phase of the received RF calibration signal to adjust its timebase to maintain phase coherence with the first base station.

An ACS can maintain phase coherence for joint transmission and/or joint reception by maintaining stable RF phase and frequency alignment that drifts less than the Doppler frequency shift caused by UE mobility. Using the joint codebook, the UE 110 feeds back an indication of a desired phase vector (precoding matrix) that will be applied by the ACS. As long as the base stations' clocks within ACS do not drift to the point of making the UE feedback outdated, phase coherence can be maintained.

In another aspect, the joint-codebook can depend on the antenna configuration of the base stations forming the ACS, such as a number of antenna ports, a number of antenna panels, and a number of beams for each row and each column of antenna elements used for azimuth and elevation beamforming, respectively. For example, a base station in a first ACS may configure part of the available antenna elements (e.g., one sub-panel) for the first ACS, and the base station can use other sub-panels for a second ACS, as one base station can concurrently participate in multiple ACSs.

From the UE perspective, joint-codebooks are dynamically changing as the UE 110 can select different ACS constituents (e.g., base stations with different capabilities) at different times due to UE mobility. From the infrastructure point of view, base stations can communicate with each other to negotiate the joint-codebook once the set of base stations in the ACS is formed for a particular UE. For example, it is possible for a first base station to use a first joint-codebook with a second base station while serving a first UE, and later, for the same UE, the first base station can use a second joint-codebook with a third base station when the base stations included in the ACS for the UE changes from the first base station and the second base station to the first base station and the third base station.

In an aspect, the ACS or the coordinating base station of the ACS can send a joint-codebook via Radio Resource Control (RRC) or Non-Access Stratum (NAS) messages to the UE. The ACS or the coordinating base station of the ACS also sends a Channel State Information-Reference Signal (CSI-RS) configuration to the UE along with the joint-codebook. Alternatively, the CSI-RS configuration can be sent in a separate message from the joint-codebook message. The joint-codebook includes a set of precoding matrices for the ACS. In one alternative, there can be a predefined joint-codebook that is shared between the ACS and the UE where the ACS sends an index of the predefined joint-codebook to the UE 110. The UE 110 measures Channel State Information-Reference Signals (CSI-RS) received from the base stations in the ACS to determine a precoding matrix for joint communication with the ACS. Typically, the UE 110 tries multiple precoding matrix hypotheses to choose a precoding matrix such that the UE-expected downlink (DL) signal-to-interference-plus-noise ratio (SINR) is maximized. After selecting a precoding matrix, the UE 110 sends a Precoding Matrix Indicator (PMI) to the ACS to indicate the precoding matrix that the UE has selected from the joint-codebook.

The coordinating base station 121 uses any suitable generating procedure, such as Fast Fourier Transfer (FFT) matrix-based precoding, and the capability information received from the other base stations, such as phase coherence capability, a number of antenna ports, a number of antenna panels, and a number of beams for each row and each column of antenna elements used for azimuth and elevation beamforming, respectively, to generate the precoding vectors that are included in the joint-codebook. The coordinating base station 121 dynamically generates new joint-codebooks as needed, based on UE mobility as mentioned previously.

To reduce signaling overhead, the coordinating base station 121 can communicate (e.g., using RRC or NAS messages) only the precoding vectors that have changed in the new joint-codebook relative to the previous joint-codebook. The UE 110 receives the changes to the codebook and adds and deletes (or inactivates) a subset of precoding vectors from the old joint-codebook to derive the new joint-codebook. For example, when a constituent base station is removed from an ACS, the coordinating base station 121 can indicate to the UE the indices of precoding matrices in the joint-codebook to delete (or inactivate) to generate a revised joint-codebook that no longer includes the removed base station. In another example, when a base station is added to an existing ACS, the coordinating base station 121 can send precoding matrices for the new base station to the UE such that the UE can add the new precoding matrices to the existing joint-codebook to generate a revised joint-codebook.

Base stations in the ACS can negotiate to determine a start-time at which to start using a new joint-codebook. The ACS then sends an indication of the determined timing to the UE to indicate when the UE should generate precoding index (PMI) feedback. The timing can be indicated using a system frame number and/or slot number. The coordinating base station 121 can trigger use of the new joint-codebook using a Medium Access Control (MAC) Control Element (CE) or Layer 1 DL control channel signaling.

Figure 6:
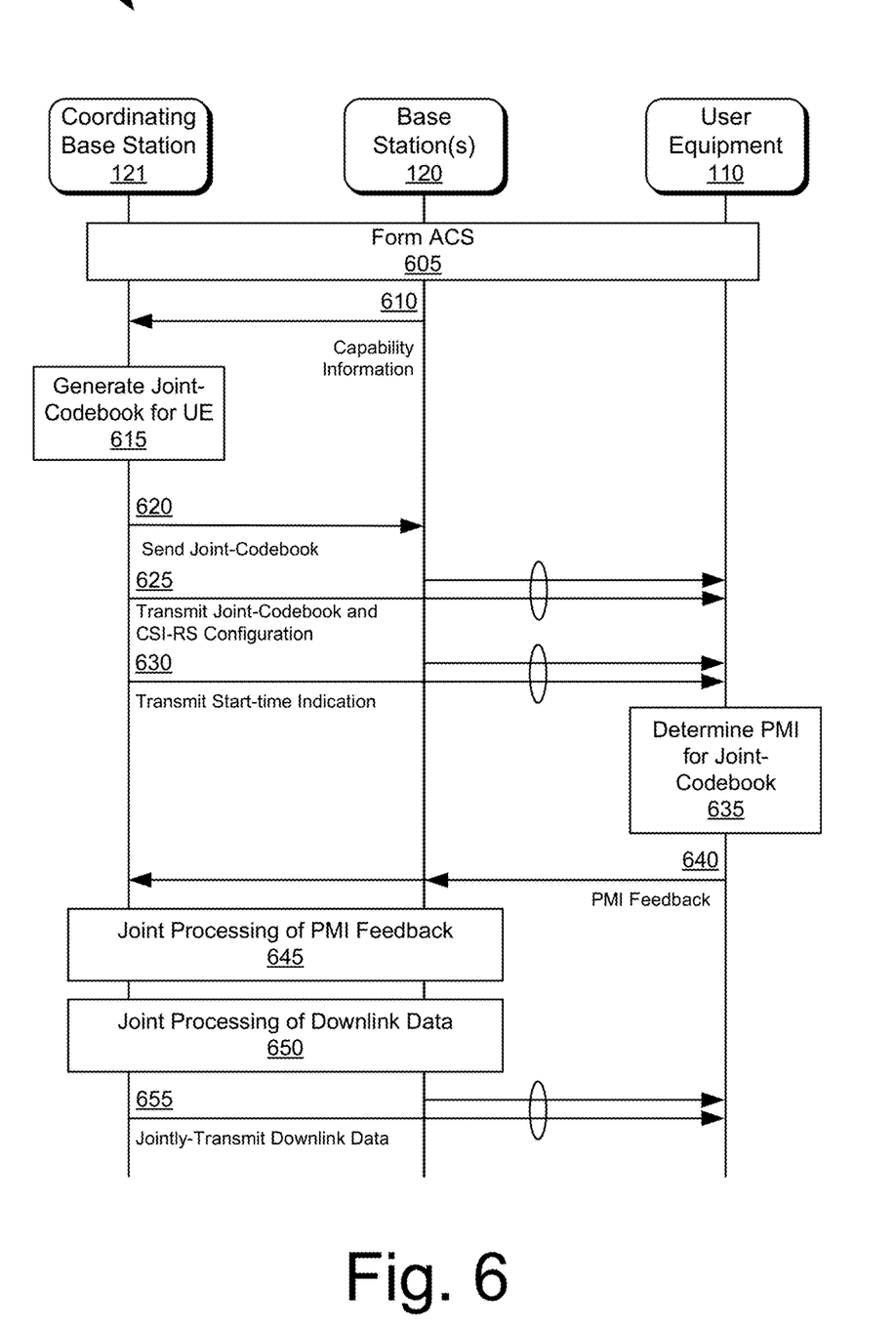
FIG. 6 illustrates example data and control transactions between an active coordination set and a user equipment in accordance with aspects of dynamic codebooks for active coordination sets.

FIG. 6 illustrates an example of data and control transactions 600 between devices in accordance with aspects of dynamic codebooks for active coordination sets. The messaging diagram 600 illustrates generation and communication of a joint-codebook for the UE 110.

At 605, the coordinating base station 121 and one or more other base stations 120 form an ACS for the UE 110 as described above with respect to FIGS. 4 and 5. At 610, the one or more other base stations 120 in the ACS send capability information including a phase coherence capability, and MIMO and antenna configuration information, such as a number of antenna ports, a number of antenna panels, and a number of beams for each row and each column of antenna elements used for azimuth and elevation beamforming, respectively.

At 615, the coordinating base station 121 generates a joint-precoding-matrix codebook for the UE 110 using any suitable generating procedure, such as Fast Fourier Transfer (FFT) matrix-based precoding, and the parameters received from the other base stations. At 620, the coordinating base station 121 sends the joint-codebook to the one or more other base stations in the ACS. At 625, the coordinating base station 121 and the other base stations 120 jointly-transmit the joint-codebook and a CSI-RS configuration to the UE 110. At 630, the coordinating base station 121 and the other base stations 120 jointly-transmit an indication of a start-time to the UE 110 to direct the UE 110 to begin using the joint-codebook at the indicated start-time. In some implementations, any or both of messages 625, 630 may be jointly-transmitted without coherent beamforming.

At 635, the UE receives and measures Channel State Information-Reference Signals (CSI-RS) from the ACS to determine a precoding matrix from the joint-codebook. At 640, the UE 110 transmits PMI feedback to the ACS that is jointly-received by the coordinating base station 121 and the one or more other base stations 120 in the ACS. At 645, each base station in the ACS receives the PMI feedback signaling and demodulates the PMI feedback transmission. The base stations 120 send the demodulated PMI feedback, using the Xn interface, to the coordinating base station 121 that aggregates and jointly-processes the demodulated PMI feedback into decoded PMI feedback results. The process at 645, and described above, can also be used to in the ACS to jointly-process other received uplink control and data signals.

At 650 the coordinating base station 121 and the one or more other base stations 120 in the ACS jointly-process downlink data using the joint-codebook for the UE 110. At 655, the coordinating base station 121 and the one or more other base stations 120 in the ACS jointly-transmit the downlink control and data signals to the UE 110 based on the PMI feedback results. Joint-codebook PMI feedback enables phase-coherent beamformed transmissions from the base stations in the ACS. The phase-coherent beamformed transmissions provide an improved signal-to-noise ratio and increased reception signal strength at the UE that increases range, power efficiency, and data throughput.

Example Methods

Figure 7:
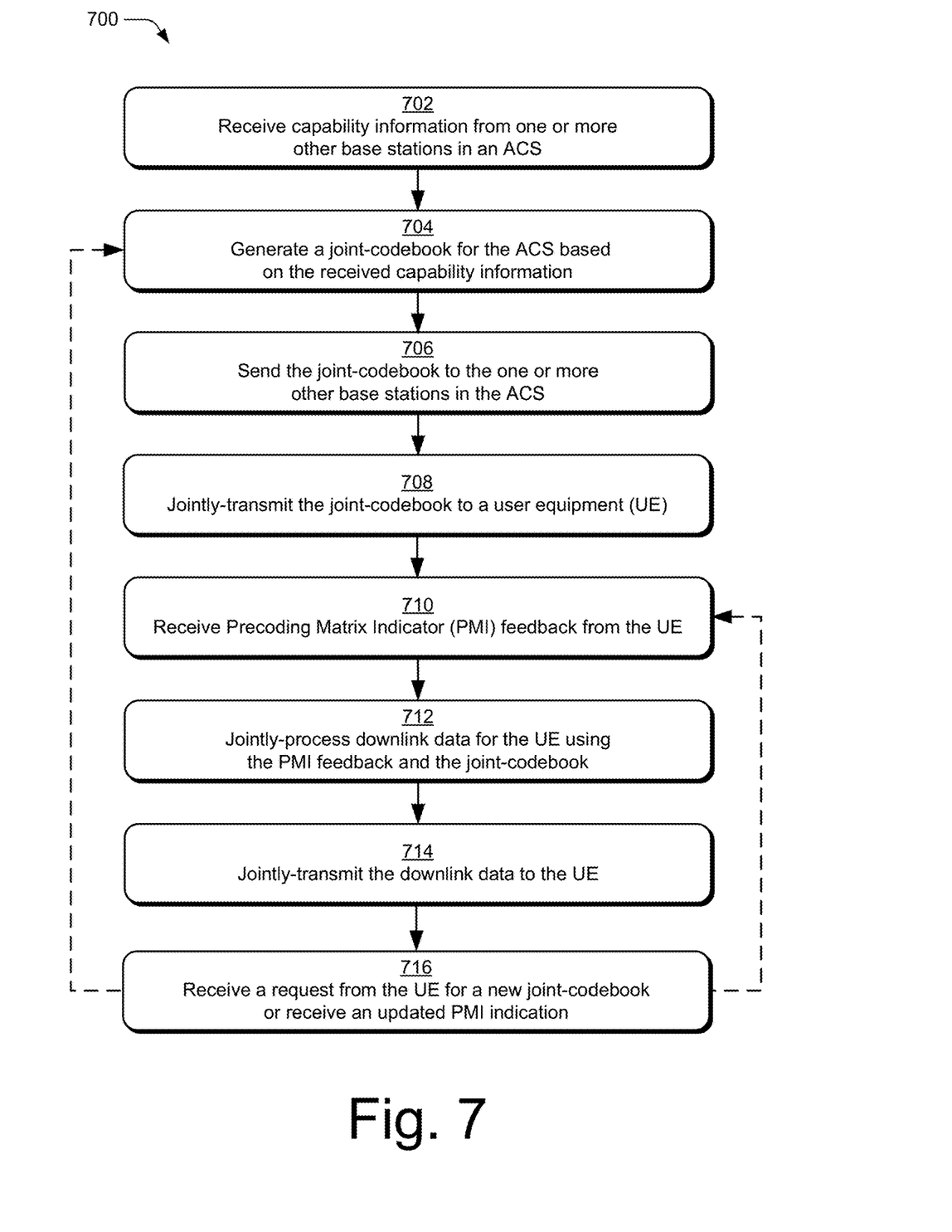
FIG. 7 illustrates an example method for a base station in accordance with aspects of dynamic codebooks for active coordination sets.

Example method 700 is described with reference to FIG. 7 in accordance with one or more aspects of dynamic codebooks for active coordination sets. FIG. 7 illustrates example method(s) 700 of dynamic codebooks for active coordination sets as generally related to the base station 121 generating and communicating a joint-codebook to the UE 110.

At block 702, a base station receives capability information from one or more other base stations in an ACS. For example, a base station (e.g., the coordinating base station 121) receives (at 610) capability information from one or more other base stations (e.g., the base stations 122 and 123) in the ACS. The capability information includes a phase coherence capability, and MIMO and antenna configuration information, such as a number of antenna ports, a number of antenna panels, and a number of beams for each row and each column of antenna elements used for azimuth and elevation beamforming, respectively At block 704, the base station generates a joint-codebook for the ACS based on the received capability information. For example, the base station (at 615) generates a joint-codebook specific to a UE (e.g., the UE 110) for the ACS based on the received capability information. The base station can use any suitable generation technique such as Fast Fourier Transfer (FFT) matrix-based precoding.

At block 706, the base station sends the joint-codebook to the one or more other base stations in the ACS. For example, the base station sends the joint-codebook (at 620) to the other base stations using the Xn interface (e.g., the Xn interface 112).

At block 708, the base station jointly-transmits the joint-codebook to the UE. For example, the base station and the other base stations in the ACS jointly-transmit (at 625) the joint-codebook to the UE. The transmission of the joint-codebook directs the UE to determine PMI feedback (at 635).

At block 710, the base station receives Precoding Matrix Indicator (PMI) feedback from the UE. For example, based on transmitting the joint-codebook to the UE (at 625) and optionally transmitting a start-time indication (at 630), the base station receives PMI feedback from the UE (at 640). The coordinating base station 121 receives the demodulated PMI feedback signals from the other base stations in the ACS that have demodulated the received PMI feedback and sent that demodulated feedback to the coordinating base station 121. The coordinating base station 121 aggregates and jointly-processes (at 645) the received, demodulated PMI feedback along with demodulated PMI feedback that the coordinating base station 121 received to obtain the jointly-received decoded PMI feedback result. As noted previously, the process of receiving and jointly-processing 710 uplink signals may be used for not only the PMI feedback but also other control and data signals.

At block 712, the base station jointly-processes downlink data for the UE using the PMI feedback and the joint-codebook and sends a PMI feedback result to the other base stations in the ACS. For example, based on the PMI feedback, the base station and the other base stations in the ACS select a precoding vector to jointly-process (at 650) downlink data for the UE. The base station sends the PMI feedback to other base stations using the Xn interface. In addition to the PMI feedback, the base station sends downlink data, air interface resource allocations, and/or timing advance information for joint-transmission to the other base stations in the ACS.

At block 714, the base station jointly-transmits the downlink data to the UE. For example, the base station and the other base stations in the ACS jointly-transmit (at 655) the downlink data to the UE.

At optional block 716, the base station receives a request from the UE for a new joint-codebook or receives an updated PMI indication. For example, the UE measures a low SINR for received downlink data and transmits a request to the ACS for a new joint-codebook. The ACS jointly-receives the request and the method flow transitions to block 704 to generate the new joint-codebook. Alternatively, if the base station receives an updated PMI indication, the method skips back to block 710 and sends the updated PMI indication to the other base stations in the ACS.

The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

In the following text some examples are described:

Example 1: A method for determining a joint-codebook for wireless communication with a user equipment, UE, by a base station in an active coordination set, ACS, the method comprising the base station:
receiving capability information from one or more other base stations in the ACS;
generating a joint-codebook for the ACS based on the received capability information;
sending the joint-codebook to the one or more other base stations in the ACS;
jointly-transmitting the joint-codebook to the UE;
receiving Precoding Matrix Indicator, PMI, feedback from the UE; jointly-processing downlink data for the UE using the PMI feedback and the joint-codebook; and
jointly-transmitting the downlink data to the UE.

Example 2. The method of example 1, wherein the receiving the capability information from one or more other base stations in the ACS comprises:
receiving a phase coherence capability from at least one of the one or more other base stations in the ACS.

Example 3. The method of example 2, further comprising the base station:
determining that the base station and the one or more other base stations in the ACS share a common phase coherence capability; and
wherein the generating a joint-codebook for the ACS comprises:
generating a set of precoding matrices that are common to the base station and the one or more other base stations in the ACS.

Example 4. The method of example 2, further comprising the base station:
determining that the base station and the one or more other base stations in the ACS have different phase coherence capabilities; and
wherein the generating a joint-codebook for the ACS comprises:
generating a first set of precoding matrices for a first subset of the base stations in the ACS that have a first phase coherence capability;
generating a second set of precoding matrices for a second subset of the base stations in the ACS that have a second phase coherence capability; and
including the first set of precoding matrices and the second set of precoding matrices in the joint-codebook for the ACS.

Example 5. The method of example 4, wherein the ACS includes the base station and multiple other base stations, the method further comprising the base station:
scheduling the first subset of the base stations in the ACS to transmit downlink data to the UE in a first timeslot using the first set of precoding matrices; and
scheduling the second subset of the base stations in the ACS to transmit the downlink data to the UE in a second timeslot using second set of precoding matrices.

Example 6. The method of any one of examples 2 to 5, wherein the phase coherence capability indicates a source of a phase reference, and wherein the source of the phase reference includes a Global Navigation Satellite System, GNSS, IEEE 1588 Precision Time Protocol, PTP, or Synchronous Ethernet, SyncE.

Example 7. The method of any one of the preceding examples, wherein the receiving the capability information from one or more other base stations in the ACS comprises:
receiving an antenna configuration from at least one of the one or more other base stations in the ACS.

Example 8. The method of example 7, wherein the antenna configuration includes one or more of:
a number of antenna ports;
a number of antenna panels;
a number of beams for each row of antenna elements used for azimuth beamforming; or
a number of beams for each column of the antenna elements used for elevation beamforming.

Example 9. The method of any one of the preceding examples, wherein the jointly-transmitting the joint-codebook to the UE comprises:
jointly transmitting a Channel State Information-Reference Signal, CSI-RS configuration with the joint codebook.

Example 10. The method of any one of the preceding examples, further comprising the base station:
jointly-transmitting a start-time indication to the UE to direct the UE to begin using the joint-codebook at the indicated start-time.

Example 11. The method of example 10, wherein the jointly-transmitting a start-time indication to the UE directs the UE to measure the CSI-RS to generate the PMI feedback.

Example 12. The method of example 10, wherein the receiving the PMI feedback from the UE comprises:
receiving the PMI feedback from the UE after the indicated start-time.

Example 13. The method of example 10 or example 11, wherein the jointly-transmitting a start-time indication to the UE comprises:
jointly-transmitting a start-time indication to the UE using a Medium Access Control, MAC, Control Element, CE, or Layer 1 downlink control channel signaling.

Example 14. The method of any one of the preceding examples, wherein the jointly-transmitting the joint-codebook to the UE comprises:
jointly-transmitting the joint-codebook to the UE using Radio Resource Control, RRC, messages; or
jointly-transmitting the joint-codebook to the UE using Non-Access Stratum, NAS, messages.

Example 15. The method of any one of the preceding examples, wherein the sending the joint-codebook to the one or more other base stations in the ACS comprises:
sending the joint-codebook to the one or more other base stations in the ACS using an Xn interface.

Example 16. The method of any one of the preceding examples, further comprising the base station:
sending PMI feedback results to the one or more other base stations in the ACS using the Xn interface.

Example 17. The method of any one of the preceding examples, further comprising the base station:
sending the downlink data to the one or more other base stations in the ACS using the Xn interface.

Example 18. The method of any one of the preceding examples, further comprising the base station:
receiving an updated PMI indication from the UE; and
sending the updated PMI indication to the one or more other base stations in the ACS using the Xn interface.

Example 19. The method of any one of the preceding examples, further comprising the base station:
receiving a request for an updated joint-codebook from the UE;
generating an updated joint-codebook for the set of base stations in the ACS;
sending the updated joint-codebook to the set of base stations in the ACS; and
jointly-transmitting the updated joint-codebook to the UE.

Example 20. The method of any one of the preceding examples, wherein based on a change to the base stations included in the ACS, the method further comprising the base station:
generating a revised joint-codebook for an updated set of base stations in the ACS;
sending the revised joint-codebook to the updated set of base stations in the ACS; and
jointly-transmitting the revised joint-codebook to the UE.

Example 21. A base station comprising:
a wireless transceiver;
a processor; and
instructions for a base station manager that are executable by the processor to configure the base station to perform the method of any one of examples 1 to 20.

Example 22. The base station of example 21, wherein the base station is a coordinating base station of the ACS.

Example 23: A computer-readable medium comprising instructions that, when executed by a processor, cause an apparatus comprising the processor to perform any of the methods of examples 1 to 20.

Although aspects of dynamic codebooks for active coordination sets have been described in language specific to features and/or methods, the subject of the appended claims is not necessarily limited to the specific features or methods described. Rather, the specific features and methods are disclosed as example implementations of dynamic codebooks for active coordination sets, and other equivalent features and methods are intended to be within the scope of the appended claims. Further, various different aspects are described, and it is to be appreciated that each described aspect can be implemented independently or in connection with one or more other described aspects.

What is claimed is:

1. A method for determining a joint-codebook for wireless communication with a user equipment (UE) by a base station in an active coordination set (ACS) the method comprising the base station:
receiving capability information from one or more other base stations in the ACS;
generating a joint-codebook for the ACS based on the received capability information;
sending the joint-codebook to the one or more other base stations in the ACS;
jointly-transmitting the joint-codebook to the UE;
receiving Precoding Matrix Indicator (PMI) feedback from the UE;
jointly-processing downlink data for the UE using the PMI feedback and the joint-codebook; and
jointly-transmitting the downlink data to the UE.

2. The method of claim 1, wherein the receiving the capability information from one or more other base stations in the ACS comprises:
receiving a phase coherence capability from at least one of the one or more other base stations in the ACS.

3. The method of claim 2, further comprising the base station:
determining that the base station and the one or more other base stations in the ACS share a common phase coherence capability; and
wherein the generating a joint-codebook for the ACS comprises:
generating a set of precoding matrices that are common to the base station and the one or more other base stations in the ACS.

4. The method of claim 2, further comprising the base station:
determining that the base station and the one or more other base stations in the ACS have different phase coherence capabilities; and
wherein the generating a joint-codebook for the ACS comprises:
generating a first set of precoding matrices for a first subset of the base stations in the ACS that have a first phase coherence capability;
generating a second set of precoding matrices for a second subset of the base stations in the ACS that have a second phase coherence capability; and
including the first set of precoding matrices and the second set of precoding matrices in the joint-codebook for the ACS.

5. The method of claim 4, wherein the ACS includes the base station and multiple other base stations, the method further comprising the base station:
scheduling the first subset of the base stations in the ACS to transmit downlink data to the UE in a first timeslot using the first set of precoding matrices; and
scheduling the second subset of the base stations in the ACS to transmit the downlink data to the UE in a second timeslot using second set of precoding matrices.

6. The method of claim 2, wherein the phase coherence capability indicates a source of a phase reference, and wherein the source of the phase reference includes a Global Navigation Satellite System (GNSS), IEEE 1588 Precision Time Protocol (PTP), or Synchronous Ethernet (SyncE).

7. The method of claim 1, wherein the receiving the capability information from one or more other base stations in the ACS comprises:
receiving an antenna configuration from at least one of the one or more other base stations in the ACS.

8. The method of claim 7, wherein the antenna configuration includes one or more of:
a number of antenna ports;
a number of antenna panels;
a number of beams for each row of antenna elements used for azimuth beamforming; or
a number of beams for each column of the antenna elements used for elevation beamforming.

9. The method of claim 1, wherein the jointly-transmitting the joint-codebook to the UE comprises:
jointly transmitting a Channel State Information-Reference Signal (CSI-RS) configuration with the joint codebook.

10. The method of claim 1, further comprising the base station:
jointly-transmitting a start-time indication to the UE to direct the UE to begin using the joint-codebook at the indicated start-time.

11. The method of claim 10, wherein the jointly-transmitting a start-time indication to the UE directs the UE to measure a CSI-RS to generate the PMI feedback.

12. The method of claim 1, wherein the jointly-transmitting the joint-codebook to the UE comprises:
  jointly-transmitting the joint-codebook to the UE using Radio Resource Control (RRC) messages or
  jointly-transmitting the joint-codebook to the UE using Non-Access Stratum (NAS) messages.

13. The method of claim 1, wherein the sending the joint-codebook to the one or more other base stations in the ACS comprises:
  sending the joint-codebook to the one or more other base stations in the ACS using an Xn interface.

14. The method of claim 1, further comprising the base station:
  sending PMI feedback results to the one or more other base stations in the ACS using an Xn interface.

15. The method of claim 1, further comprising the base station:
  sending the downlink data to the one or more other base stations in the ACS using an Xn interface.

16. The method of claim 1, further comprising the base station:
  receiving an updated PMI indication from the UE; and
  sending the updated PMI indication to the one or more other base stations in the ACS using an Xn interface.

17. The method of claim 1, further comprising the base station:
  receiving a request for an updated joint-codebook from the UE;
  generating an updated joint-codebook for the base stations in the ACS;
  sending the updated joint-codebook to the base stations in the ACS; and
  jointly-transmitting the updated joint-codebook to the UE.

18. The method of claim 1, wherein based on a change to the base stations included in the ACS, the method further comprising the base station:
  generating a revised joint-codebook for an updated set of base stations in the ACS;
  sending the revised joint-codebook to the updated set of base stations in the ACS; and
  jointly-transmitting the revised joint-codebook to the UE.

19. A base station comprising:
  a wireless transceiver;
  a processor; and
  instructions for a base station manager that are executable by the processor to configure the base station to:
    receive capability information from one or more other base stations in an active coordination set (ACS);
    generate a joint-codebook for the ACS based on the received capability information;
    send the joint-codebook to the one or more other base stations in the ACS;
    jointly-transmit the joint-codebook to a user equipment (UE);
    receive Precoding Matrix Indicator (PMI) feedback from the UE;
    jointly-process downlink data for the UE using the PMI feedback and the joint-codebook; and
    jointly-transmit the downlink data to the UE.

20. The base station of claim 19, wherein the instruction to receive the capability information from one or more other base stations in the ACS are executable by the processor to configure the base station to:
  receive a phase coherence capability from at least one of the one or more other base stations in the ACS.

* * * * *